(12) United States Patent
Zhang et al.

(10) Patent No.: US 11,251,842 B2
(45) Date of Patent: Feb. 15, 2022

(54) METHOD FOR CONFIGURING NON-CODEBOOK BASED UL MIMO TRANSMISSION

(71) Applicants: QUALCOMM Incorporated, San Diego, CA (US); Yu Zhang, Beijing (CN); Chenxi Hao, Beijing (CN); Wanshi Chen, San Diego, CA (US); Peter Gaal, San Diego, CA (US); Hao Xu, Beijing (CN)

(72) Inventors: Yu Zhang, Beijing (CN); Chenxi Hao, Beijing (CN); Wanshi Chen, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/645,894

(22) PCT Filed: Sep. 11, 2018

(86) PCT No.: PCT/CN2018/105013
§ 371 (c)(1),
(2) Date: Mar. 10, 2020

(87) PCT Pub. No.: WO2019/047972
PCT Pub. Date: Mar. 14, 2019

(65) Prior Publication Data
US 2020/0212972 A1    Jul. 2, 2020

(30) Foreign Application Priority Data

Sep. 11, 2017  (WO) ................ PCT/CN2017/101302

(51) Int. Cl.
| | | |
|---|---|---|
| *H04B 7/0456* | (2017.01) | |
| *H04B 7/06* | (2006.01) | |
| *H04L 5/00* | (2006.01) | |

(52) U.S. Cl.
CPC ......... *H04B 7/0456* (2013.01); *H04B 7/0617* (2013.01); *H04B 7/0628* (2013.01); *H04L 5/0048* (2013.01)

(58) Field of Classification Search
CPC ... H04B 7/0456; H04B 7/0617; H04B 7/0628
See application file for complete search history.

(56) References Cited

U.S. PATENT DOCUMENTS

| | | | | |
|---|---|---|---|---|
| 8,711,716 B2 * | 4/2014 | Chen | ................... | H04B 7/0452 370/252 |
| 8,750,205 B2 * | 6/2014 | Chen | ................... | H04B 7/0632 370/328 |

(Continued)

FOREIGN PATENT DOCUMENTS

| | | | | | |
|---|---|---|---|---|---|
| BR | 112020002373 A2 | * | 9/2020 | ........ | H04W 72/0453 |
| CN | 102415041 A | * | 4/2012 | ....... | H04L 25/03343 |

(Continued)

OTHER PUBLICATIONS

Huawei et al., Non-Codebook based Transmission for UL MIMO, 3GPP TSG RAN WG1 Meeting #90, R1-1712229, Aug. 25, 2017, 8 pages.*

(Continued)

*Primary Examiner* — Berhanu Tadese
(74) *Attorney, Agent, or Firm* — Qualcomm Incorporated

(57) ABSTRACT

Aspects of the present disclosure relate to techniques for non-codebook based uplink (UL) transmission. In some cases, a user equipment (UE) may signal, to a network entity, capability information of the UE for non-codebook uplink transmissions. The UE may then receive, signaling, from the network entity, indicating a plurality of sounding (Continued)

reference signal (SRS) configurations based at least on the signaled capability information, wherein at least one configuration indicates at least one SRS resource and determine a plurality of precoding candidates, wherein each precoding candidate is associated with a configured SRS resource. The UE may then transmit the SRSs using the associated precoding candidates.

32 Claims, 11 Drawing Sheets

(56) References Cited

U.S. PATENT DOCUMENTS

| | | | | |
|---|---|---|---|---|
| 9,124,532 | B2* | 9/2015 | Chen | H04B 7/0478 |
| 9,246,568 | B2* | 1/2016 | Gao | H04B 7/0636 |
| 9,462,280 | B2* | 10/2016 | Puri | H04N 19/124 |
| 9,559,828 | B2* | 1/2017 | Chen | H04B 7/0452 |
| 9,762,372 | B2* | 9/2017 | Ekpenyong | H04L 5/0048 |
| 10,374,768 | B2* | 8/2019 | Harrison | H04B 7/0691 |
| 10,615,859 | B2* | 4/2020 | Frenne | H04B 7/0626 |
| 2010/0322176 | A1* | 12/2010 | Chen | H04L 5/0057 370/329 |
| 2011/0032839 | A1* | 2/2011 | Chen | H04B 7/0417 370/252 |
| 2011/0103510 | A1* | 5/2011 | Gaal | H04L 1/1607 375/295 |
| 2011/0105137 | A1* | 5/2011 | Gaal | H04L 5/14 455/452.1 |
| 2011/0110455 | A1* | 5/2011 | Gaal | H04L 25/03343 375/295 |
| 2011/0305161 | A1* | 12/2011 | Ekpenyong | H04L 5/0048 370/252 |
| 2012/0155532 | A1* | 6/2012 | Puri | H04N 19/13 375/240.02 |
| 2012/0188962 | A1* | 7/2012 | Gao | H04B 7/0434 370/329 |
| 2013/0039235 | A1 | 2/2013 | Rahman et al. | |
| 2013/0142128 | A1 | 6/2013 | Yang et al. | |
| 2014/0233498 | A1* | 8/2014 | Chen | H04B 7/0452 370/329 |
| 2014/0269395 | A1* | 9/2014 | Chen | H04B 7/0417 370/252 |
| 2015/0288964 | A1* | 10/2015 | Puri | H04N 19/14 375/240.03 |
| 2016/0065282 | A1* | 3/2016 | Zhang | H04B 7/0452 370/281 |
| 2017/0078659 | A1* | 3/2017 | Puri | H04N 19/18 |
| 2017/0222856 | A1 | 8/2017 | Dinan | |
| 2018/0367205 | A1 | 12/2018 | Liu et al. | |
| 2019/0074880 | A1* | 3/2019 | Frenne | H04B 7/024 |
| 2019/0103949 | A1* | 4/2019 | Harrison | H04L 5/0023 |
| 2019/0319759 | A1* | 10/2019 | Harrison | H04L 5/0092 |
| 2020/0059951 | A1* | 2/2020 | Frenne | H04L 5/0023 |
| 2020/0186221 | A1* | 6/2020 | Frenne | H04B 7/0617 |
| 2020/0204406 | A1* | 6/2020 | Zhang | H04L 5/0053 |
| 2020/0212972 | A1* | 7/2020 | Zhang | H04B 7/0628 |
| 2021/0091907 | A1* | 3/2021 | Harrison | H04B 7/0421 |
| 2021/0136639 | A1 | 5/2021 | Osawa | |
| 2021/0160104 | A1* | 5/2021 | Wu | H04W 72/0413 |

FOREIGN PATENT DOCUMENTS

| | | | | |
|---|---|---|---|---|
| CN | 102415041 | B * | 1/2015 | H04L 25/03343 |
| CN | 102415042 | B * | 1/2016 | H04L 25/03343 |
| CN | 110999476 | A * | 4/2020 | H04L 5/00 |
| EP | 2422482 | A2 * | 2/2012 | H04L 1/1607 |
| EP | 2422483 | A2 * | 2/2012 | H04B 7/063 |
| EP | 2422484 | A2 * | 2/2012 | H04L 5/14 |
| EP | 3666010 | A1 * | 6/2020 | H04W 72/0413 |
| JP | 5726858 | B2 * | 6/2015 | H04L 5/0092 |
| KR | 20120003491 | A * | 1/2012 | H04B 7/0617 |
| KR | 20120010266 | A * | 2/2012 | H04L 25/03343 |
| KR | 101293140 | B1 * | 8/2013 | H04L 25/03343 |
| KR | 101332249 | B1 * | 11/2013 | H04L 25/0398 |
| KR | 20200039683 | A * | 4/2020 | H04L 5/0007 |
| WO | WO-2010124248 | A2 * | 10/2010 | H04L 5/14 |
| WO | WO-2010124252 | A2 * | 10/2010 | H04L 25/03343 |
| WO | WO-2010124254 | A2 * | 10/2010 | H04L 5/0092 |
| WO | 2017027055 | A1 | 2/2017 | |
| WO | 2017137090 | A1 | 8/2017 | |
| WO | WO-2019028834 | A1 * | 2/2019 | H04L 5/0007 |
| WO | WO-2019029697 | A1 * | 2/2019 | H04W 72/0413 |
| WO | WO-2019153224 | A1 * | 8/2019 | H04W 68/00 |

OTHER PUBLICATIONS

Huawei, et al., Non-Codebook based Transmission for UL MIMO, 3GPP TSG RAN WG1 NR Ad Hoc Meeting, R1-1709923, Jun. 30, 2017, 7 Pages, the whole document.*
Huawei, HiSilicon, Codebook based transmission for UL MIMO, Jun. 27, 2017, R1-1710447.*
International Search Report and Written Opinion—PCT/CN2018/105013—ISA/EPO—dated Nov. 28, 2018.
International Search Report and Written Opinion—PCT/CN2017/101302—ISA/EPO—dated May 22, 2018.
LG Electronics: "Discussion on Non-Codebook based Transmission for UL", 3GPP TSG RAN WG1 Meeting #90, R1-1713137, Aug. 25, 2017, 5 pages.
NTT Docomo Inc: "Beam Determination for Non-Codebook Based Transmission for Uplink", 3GPP TSG RAN WG1 NR Ad-Hoc Meeting, R1-1711074, Jun. 20, 2017, 3 pages.
Qualcomm Incorporated, Remaining Issues on Non-codebook Based UL Transmission, R1-1720658, 3GPP TSG RAN WG1, Meeting #91, Dec. 1, 2017, 4 pages.
Qualcomm Incorporated: "Non-Codebook Based UL Transmission", 3GPP TSG RAN WG1 #90, R1-1713388, Aug. 25, 2017, 3 pages.
Supplementary European Search Report—EP18854289—Search Authority—Munich—dated Apr. 12, 2021.
ZTE: "UL Beam management for NR MIMO", 3GPP TSG RAN WG1 Meeting #90, R1-1712299, Prague, Czechia, Aug. 21-25, 2017, Aug. 25, 2017 (Aug. 25, 2017) The Whole Document, pp. 1-7, XP051315115, Retrieved from the Internet: URL: http://www.3gpp.org/ftp/Meetings_3GPP_SYNC/RAN1/Docs/. [retrieved on Aug. 20, 2017] p. 1-p. 3.

* cited by examiner

METHOD FOR CONFIGURING NON-CODEBOOK BASED UL MIMO TRANSMISSION

CROSS-REFERENCE TO RELATED APPLICATION & PRIORITY CLAIM

This application is a national stage application under 35 U.S.C. 371 of PCT/CN2018/105013, filed Sep. 11, 2018, which claims the benefit of and priority to International Patent Cooperation Treaty Application No. PCT/CN2017/101302, filed Sep. 11, 2017, which is are hereby assigned to the assignee hereof and hereby expressly incorporated by reference herein as if fully set forth below and for all applicable purposes.

INTRODUCTION

Aspects of the present disclosure relate to wireless communications, and more particularly, to uplink transmission.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a UE. The method generally includes signaling, to a network entity, capability information of the UE for non-codebook uplink transmissions, the capability information indicating a number of groups of precoding candidates for uplink transmissions supported by the UE and, for each group, a maximum number of precoding candidates the UE can support and a maximum number of precoding candidates that can be used simultaneously by the UE, receiving signaling, from the network entity, indicating a plurality of sounding reference signal (SRS) configurations based at least on the signaled capability information, wherein at least one configuration indicates at least one SRS resource, determining a plurality of precoding candidates, wherein each precoding candidate is associated with a configured SRS resource, transmitting the SRSs using the associated precoding candidate, receiving signaling, from the network entity, indicating one or more SRS resources determined based at least on the signaled capability information, and determining the precoding for sending an uplink (UL) transmission based at least on the indicated SRS resources.

Certain aspects of the present disclosure provide a method for wireless communication that may be performed, for example, by a network entity. The method generally includes receiving signaling, from a user equipment (UE), of capability information of the UE for non-codebook uplink transmissions, the capability information indicating a number of groups of precoding candidates for uplink transmissions supported by the UE and, for each group, a maximum number of precoding candidates the UE can support and a maximum number of precoding candidates that can be used simultaneously by the UE, determining a plurality of sounding reference signal (SRS) configurations for the UE, at least based on the signaled capability information, transmitting signaling, to the UE, indicating the plurality of configurations, receiving the SRSs transmitted by the UE, determining one or more SRS resources based at least on the received SRSs and the received capability information, wherein the precoding associated with the determined SRS resources is to be used simultaneously for sending the UL transmission, and signaling, to the UE, an indication of the determined SRS resources.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
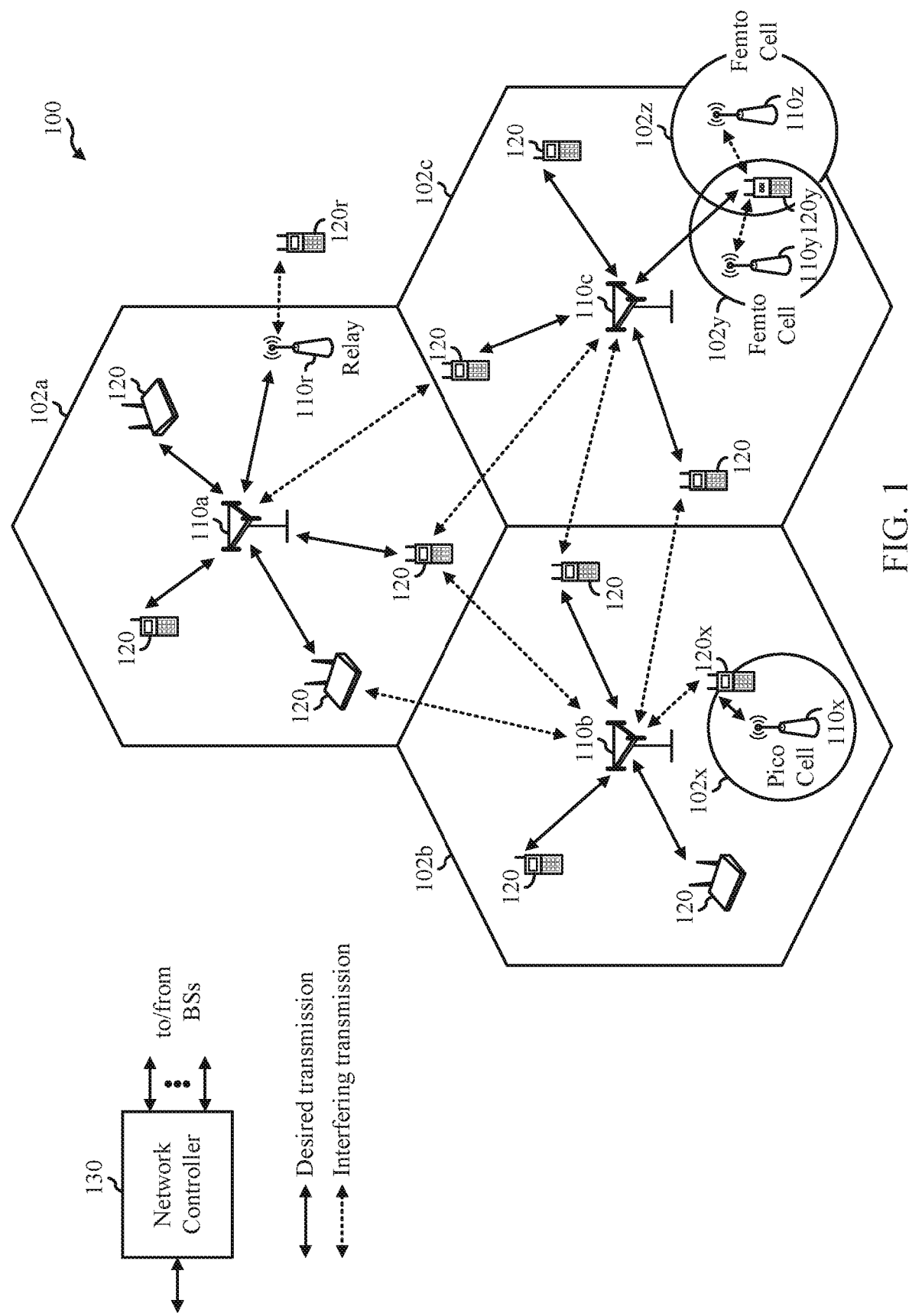
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive machine type communication (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS SYSTEM

Figure 8:
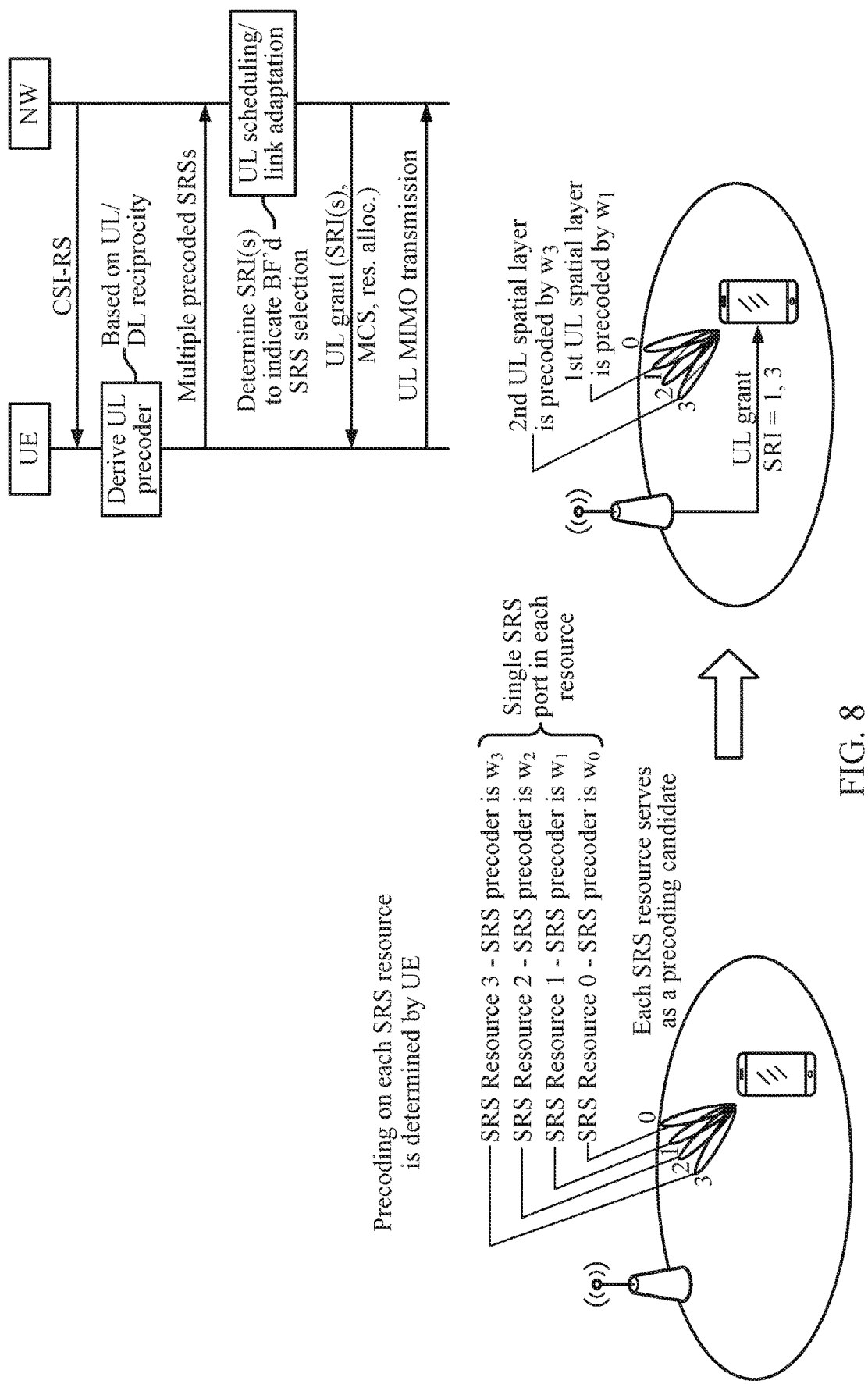
FIG. 8 illustrates an example scenario, in which aspects of the present disclosure may be practiced.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell truly cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame tuning, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, nominal Fast Fourier transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR truly be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a centralized unit (CU) CU and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
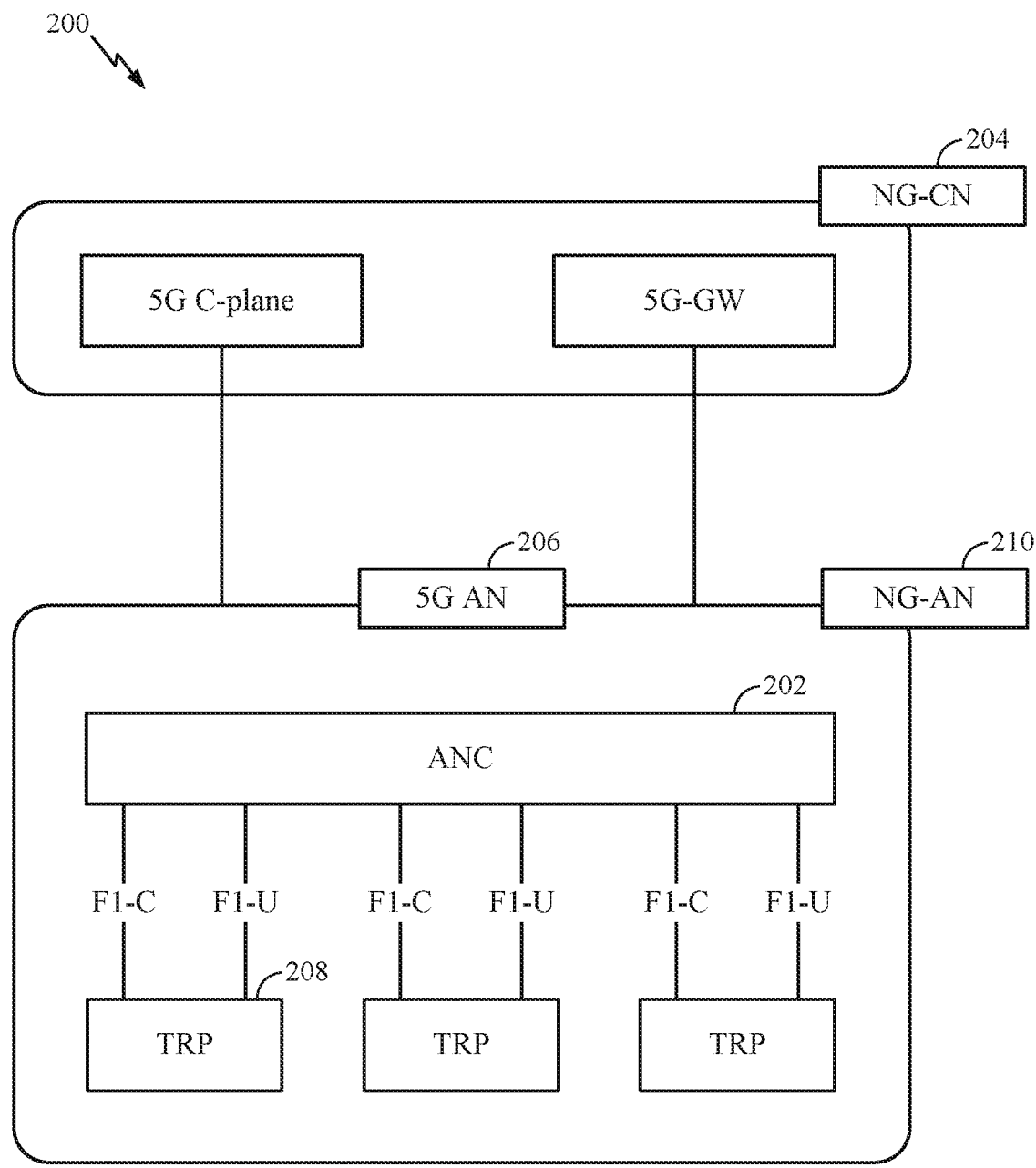
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
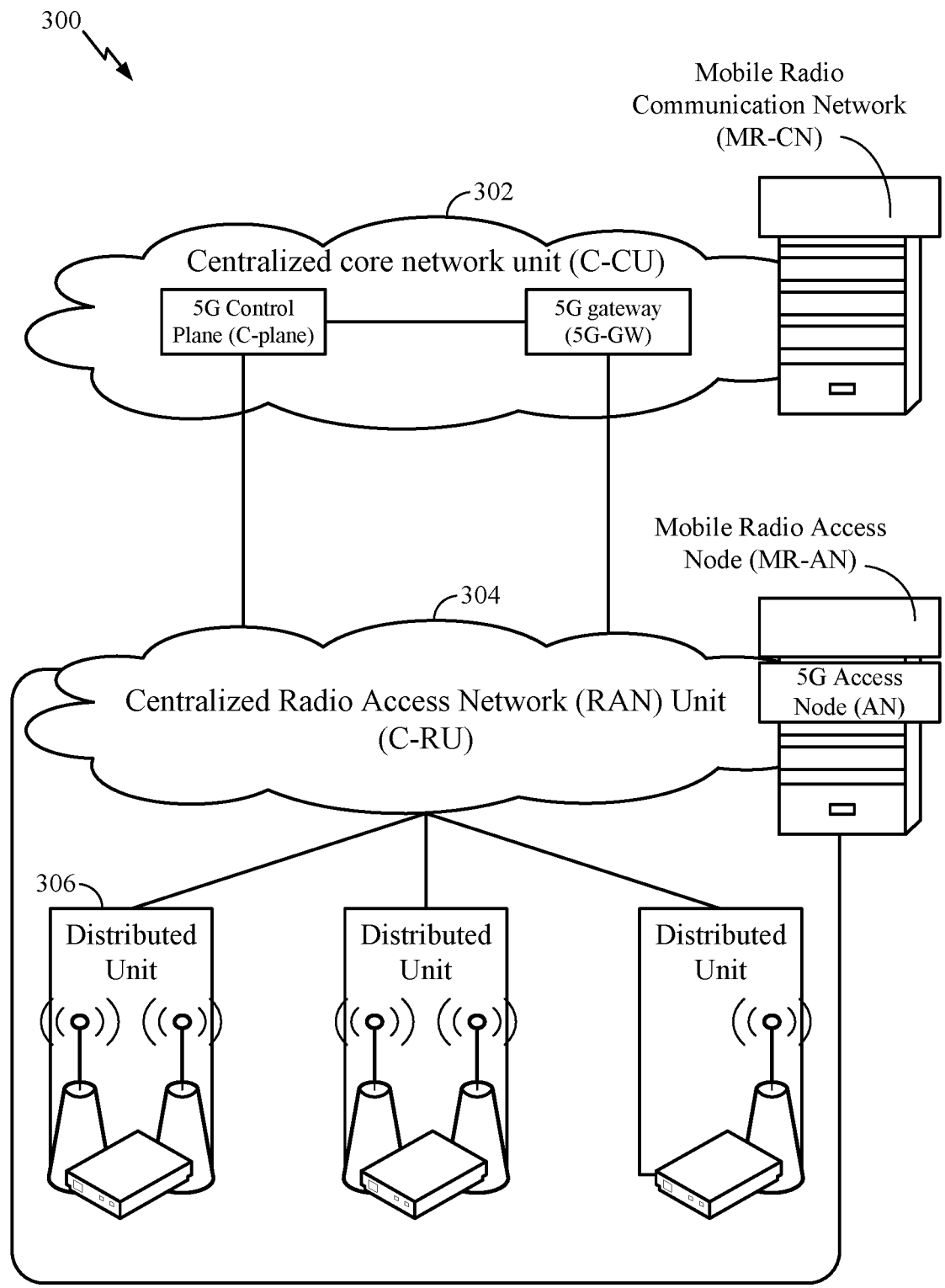
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
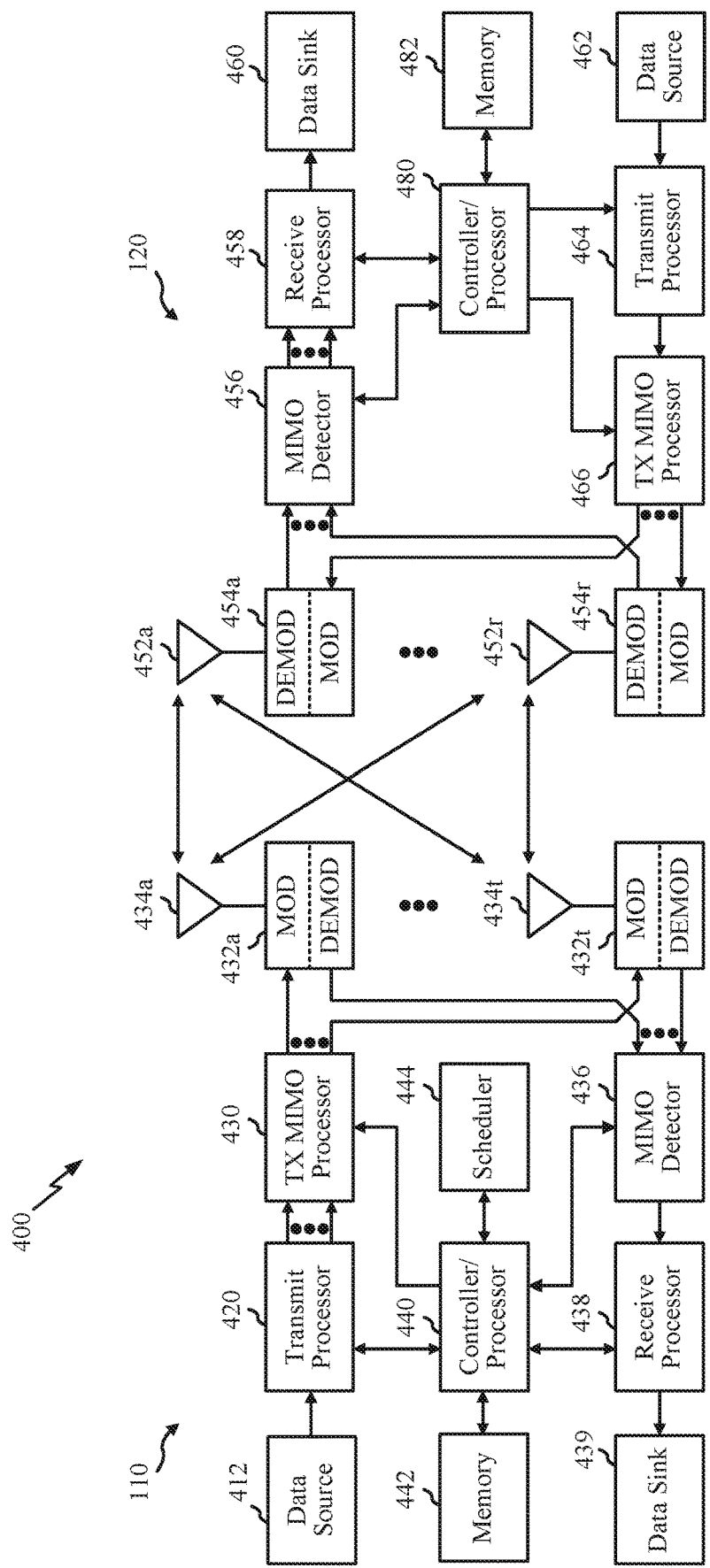
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 9 and 11-12. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the LTE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIGS. 9 and 10, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
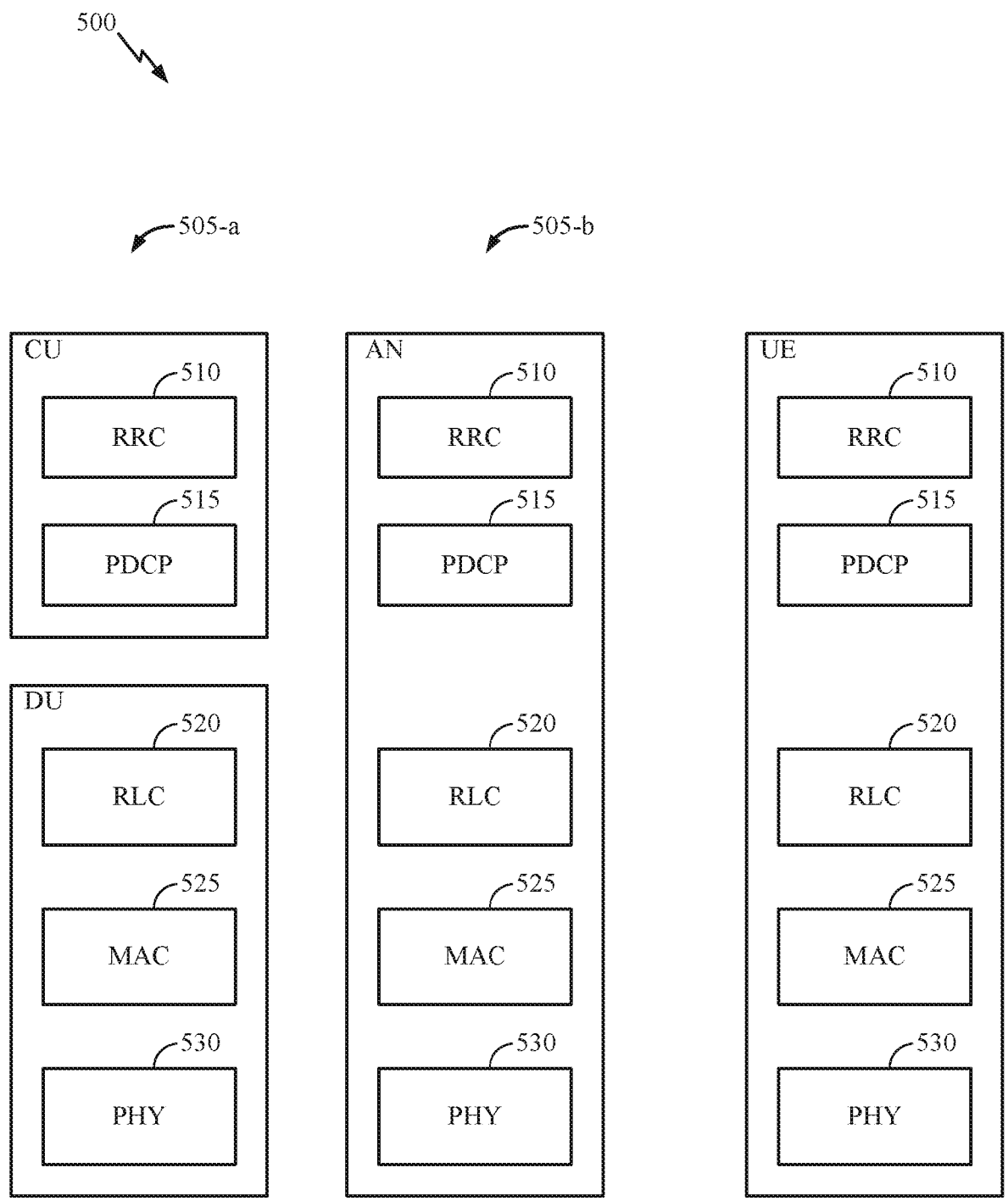
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pica cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
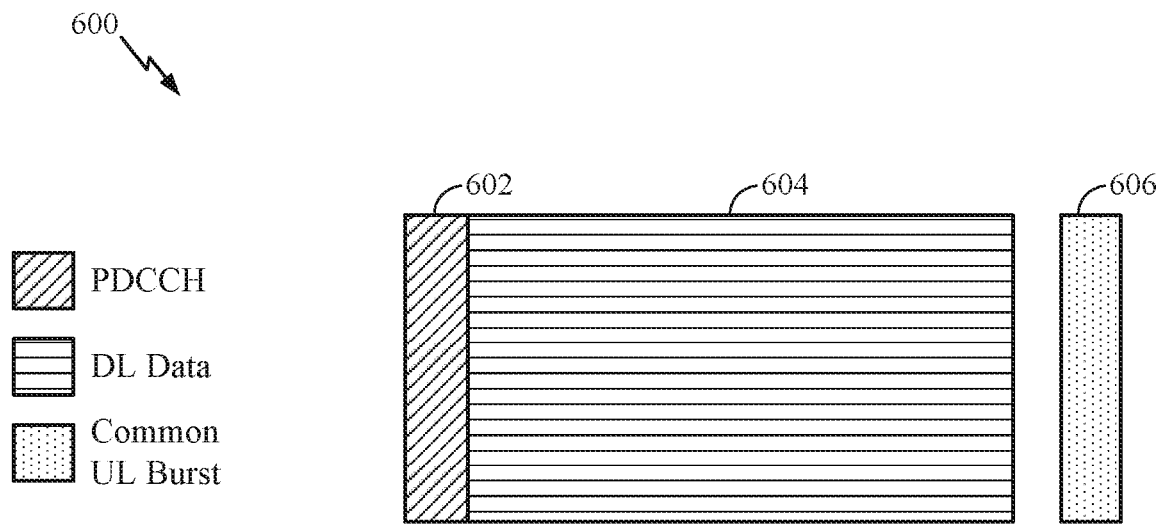
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
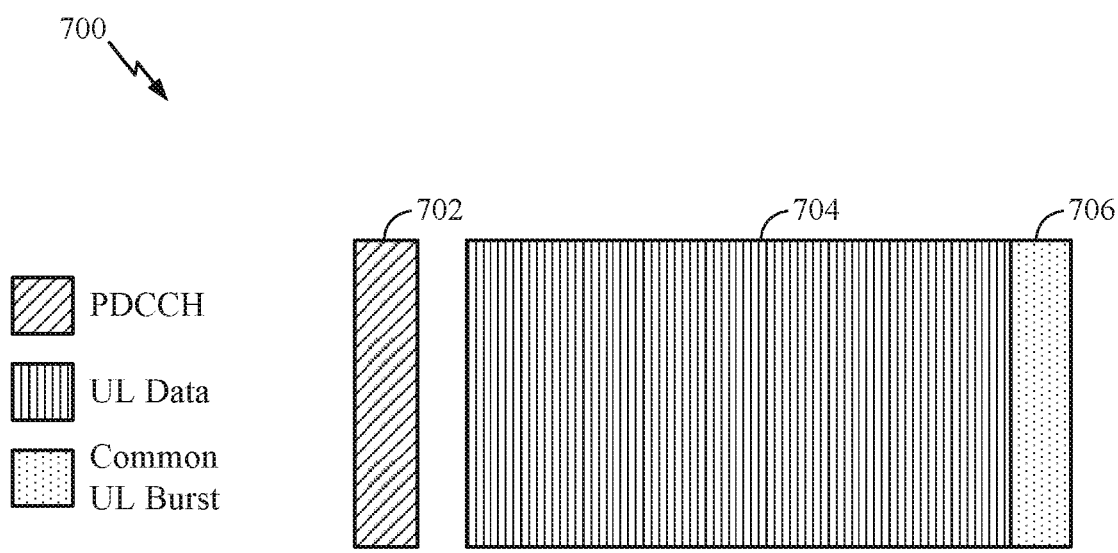
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 truly exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE CONFIGURATION OF NON-CODEBOOK BASED UL MIMO TRANSMISSION

Aspects of the present disclosure provide techniques for configuring non-codebook based uplink multiple input-multiple output (MIMO) transmissions.

In NR, there is support for at least one of codebook based UL MIMO transmission and non-codebook based UL MIMO transmission. In some cases, the codebook-based transmission may provide only limited precoding gain due to the UL codebook size. Further, codebook-based subband UL precoding may be infeasible due to the increased DCI overhead for subband PMI indication.

On the other hand, in some cases, non-codebook based UL MIMO transmission may provide substantial precoding gain. In such cases, non-codebook based UL MIMO transmission may take advantage of precoded UL sounding to perform UL link adaptation and the subband UL precoding can be supported with relatively negligible footprint in DCI.

In some cases, as illustrated in FIG. 8, UL-DL channel reciprocity may be exploited to determine UL precoders. As illustrated, the UE may provide the network (NW) multiple UL precoding candidates via precoded SRS transmissions. The NW may then decide which candidates shall be used for PUSCH precoding As illustrated, in an UL grant, the network may signal one or more SRS resource indices (SRIs) to the UE to indicate the PUSCH precoder for one or more spatial layers. However, due to the UE implementation limitations, some precoding candidates may not be signaled in the same UL grant.

Figure 9:
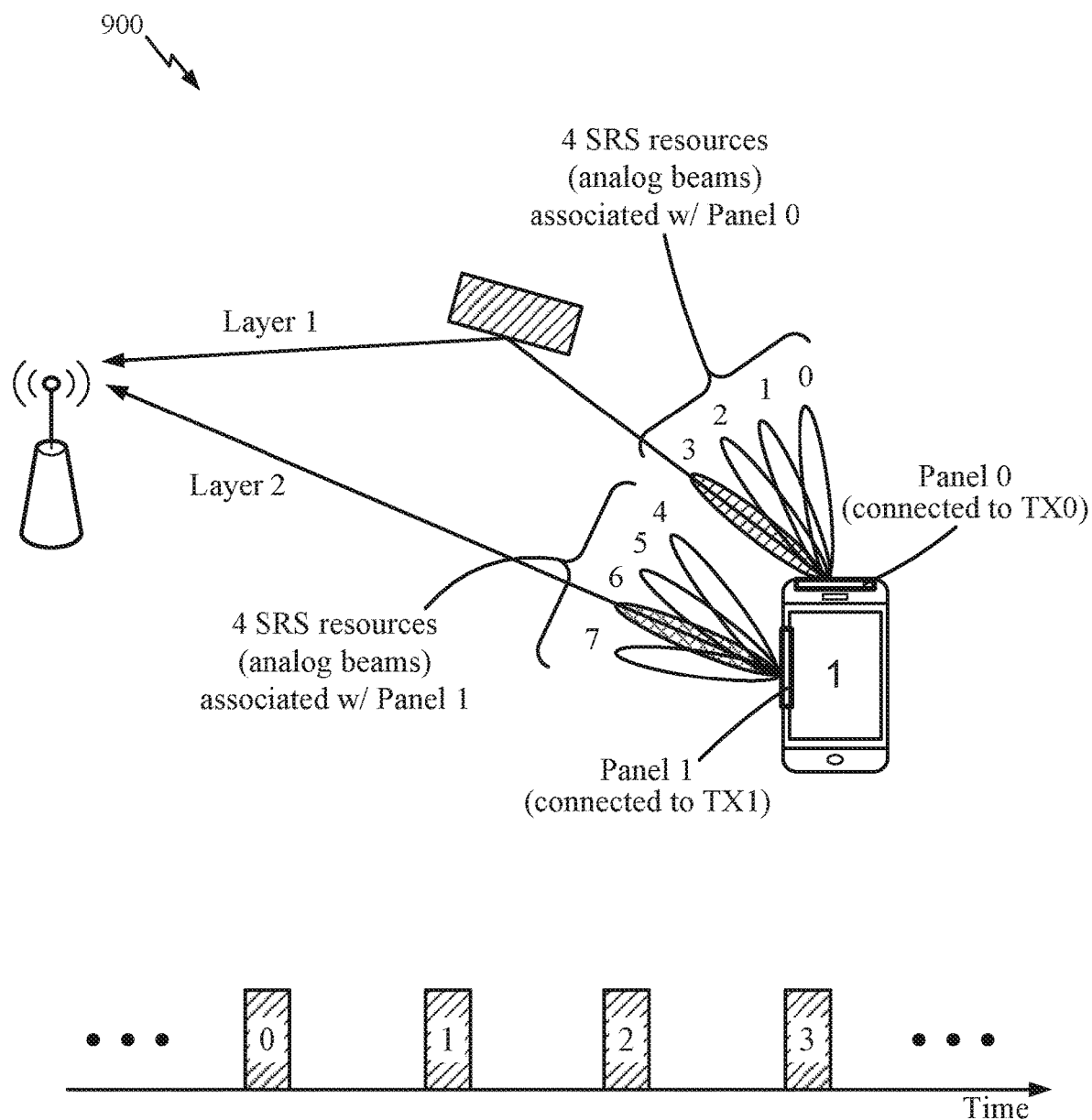
FIG. 9 illustrates example sounding reference signal (SRS) transmissions, in accordance with aspects of the present disclosure.

For example, referring to FIG. 9, multiple analog beams from one beamformer corresponding to a single transmit (TX) radio frequency (RF) chain, cannot be used simultaneously. Thus, in the illustrated example, only one of beams 0-3 may be transmitted from TX0 simultaneously with only one of beams 4-7 from TX1.

Therefore, the gNB may only signal SRS resource indicators (SRIs) such that the UL precoding transmission inferred from the signaled SRI(s) can be simultaneously performed by the UE. This presents a challenge, however, in how the gNB determine the validity of a combination of SRS resources for a UE and/or how the gNB can determine the number of SRS resources to be configured for a UE.

A gNB may need to determine the number of SRS resources to be configured for a UE. For UEs capable of up to rank-M non-codebook based UL MIMO, at least M single-port SRS resources may be needed. The maximum number of SRS resources may depend on UE capability (e.g., low-cost UEs may not support many precoding candidates).

A gNB may also need to determine the validity of a combination of SRS resources for a UE. For example, if a UE has two TX chains (as shown in FIG. 9), each connected to an antenna panel/subarray which is capable of analog beamforming only, multiple TDM SRS resources can be configured for each panel/subarray. The SRS resources configured for the same panel may not be signaled to the UE for UL precoding indication (e.g., multiple analog beams can only be used via time division multiplexing (TDM). In the example shown in FIG. 9, up to 2 SRIs can be indicated in the UL grant, one from each TX chain via an antenna panel/subarray.

Aspects of the present disclosure provide solutions that may help a gNB identify the UE capabilities to support non-codebook based UL transmission. In some cases, by grouping PUSCH precoder candidates (that are grouped) based on whether they may be simultaneously signaled or not, the UE can report capability information to the gNB that can assist in SRS resource determination.

Figure 10:
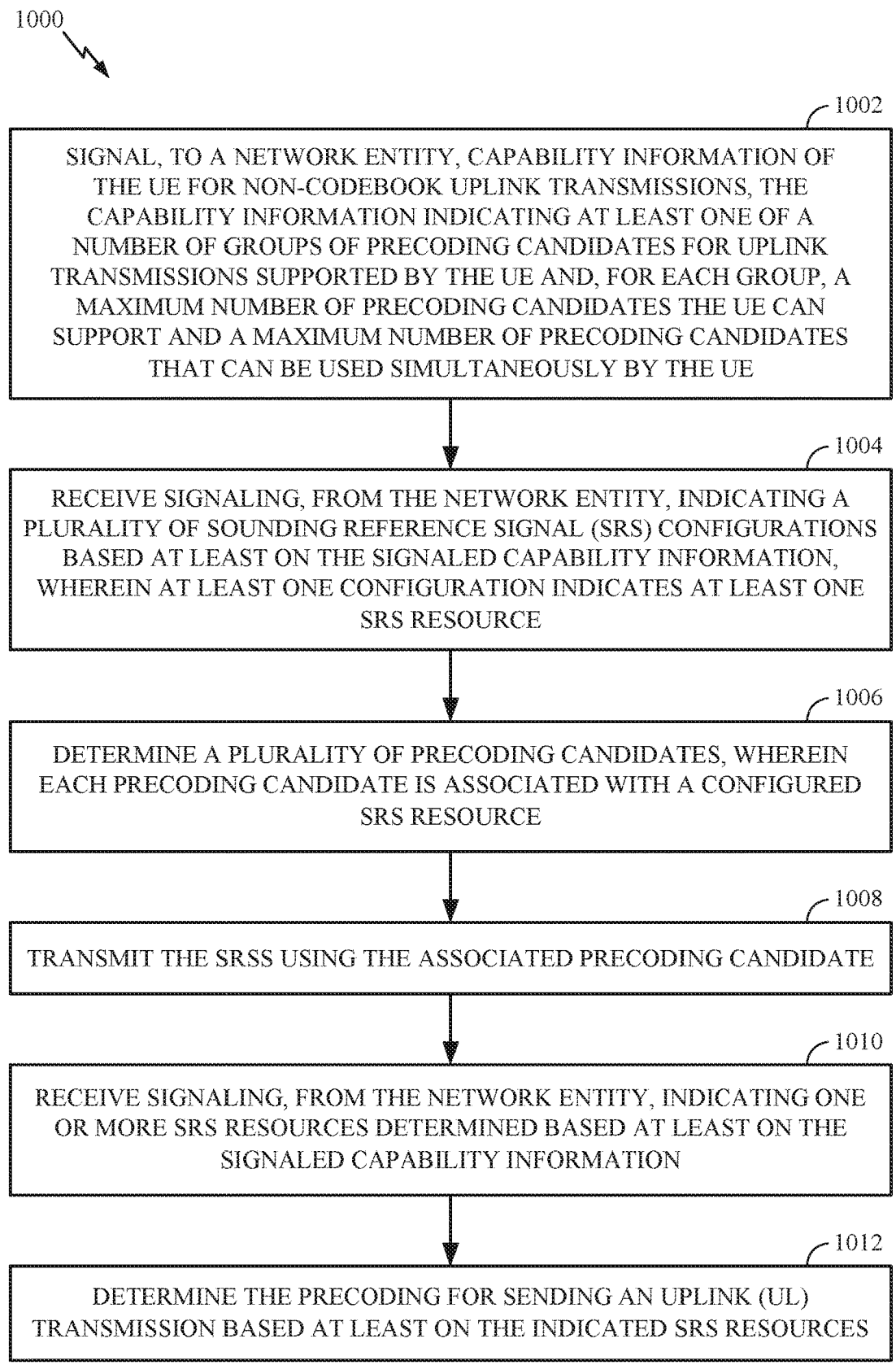
FIG. 10 illustrates example operations that may be performed by a user equipment (UE), in accordance with certain aspects of the present disclosure.

FIG. 10 illustrates example operations 1000 that may be performed by a user equipment (UE), in accordance with certain aspects of the present disclosure. Operations 1000 may be performed, for example, by a user equipment (e.g. UE 120) capable of participating in beamformed communications with a base station (e.g., a gNB).

Operations 1000 being, at 1002 by signaling, to a network entity, capability information of the UE for non-codebook uplink transmissions, the capability information indicating at least one of a number of groups of precoding candidates for uplink transmissions supported by the UE and, for each group, a maximum number of precoding candidates the UE can support and a maximum number of precoding candidates that can be used simultaneously by the UE.

At 1004, the UE receives signaling, from the network entity, indicating a plurality of sounding reference signal (SRS) configurations based at least on the signaled capability information, wherein at least one configuration indicates at least one SRS resource. At 1006, the UE determines a plurality of precoding candidates, wherein each precoding candidate is associated with a configured SRS resource. At 1008, the UE transmits the SRSs using the associated precoding candidate.

At 1010, the UE receives signaling, from the network entity, indicating one or more SRS resources determined based at least on the signaled capability information. At 1012, the UE determines the precoding for sending an uplink (UL) transmission based at least on the indicated SRS resources.

Figure 11:
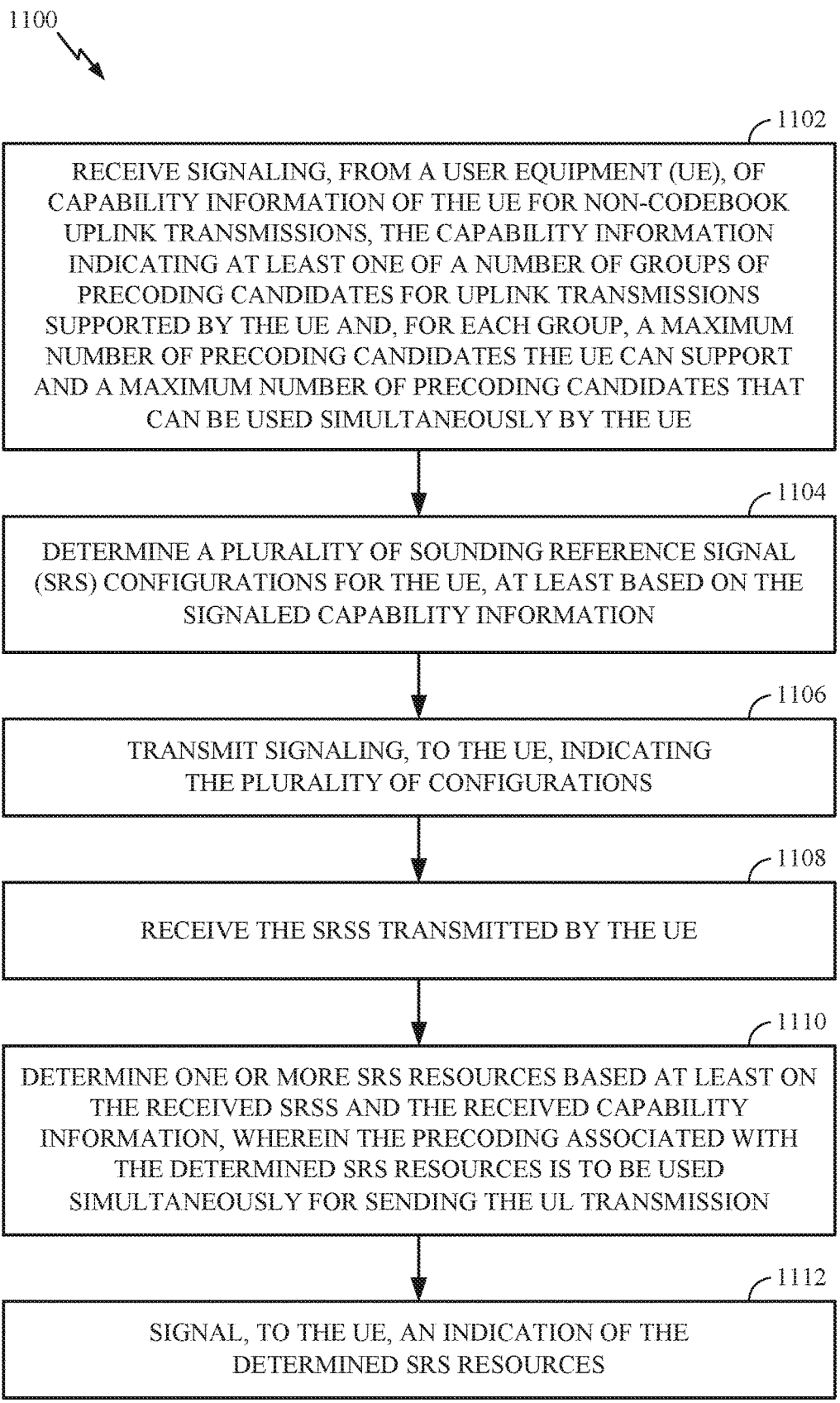
FIG. 11 illustrates example operations that may be performed by a network entity, in accordance with certain aspects of the present disclosure.
Figure 12:
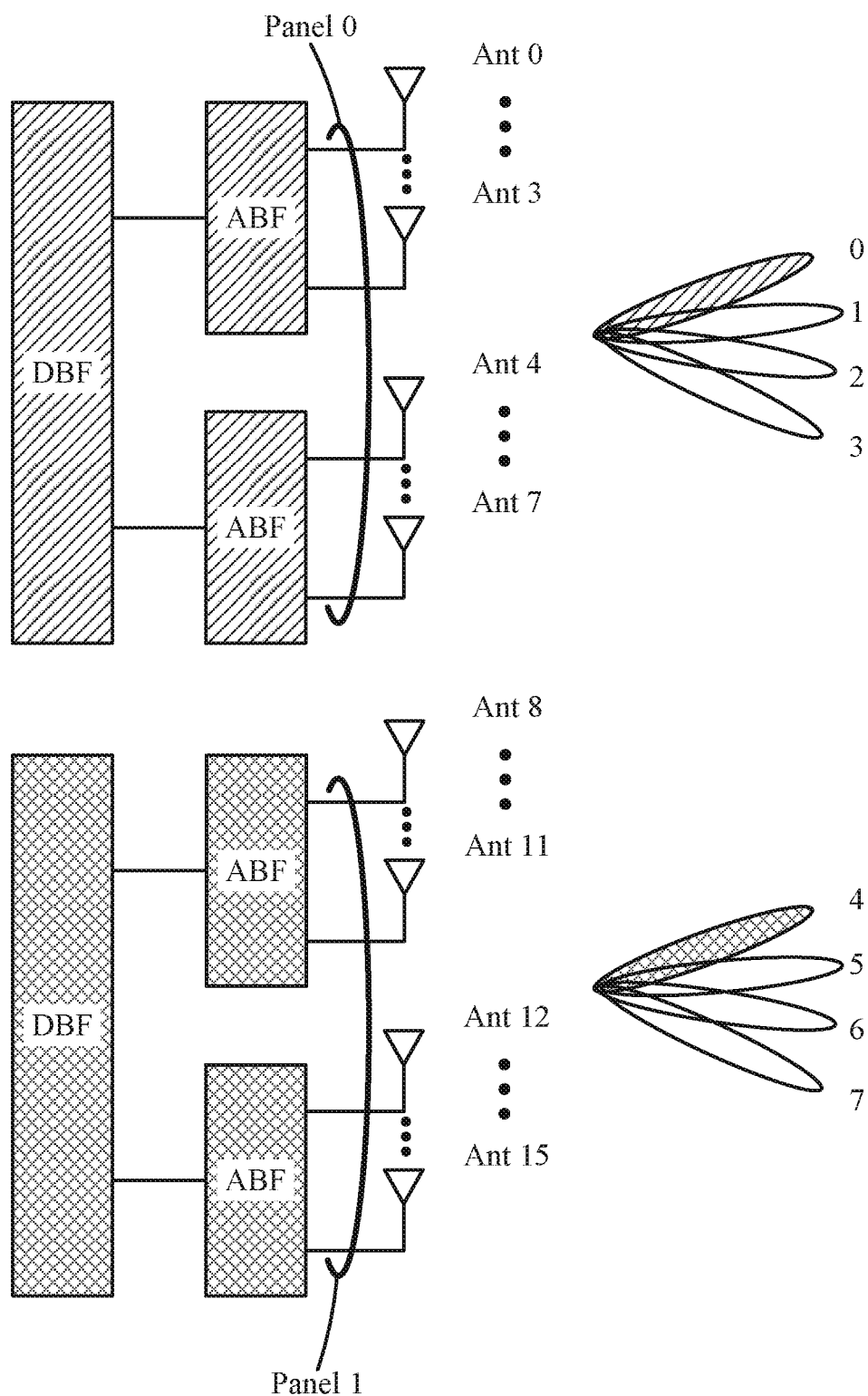
FIG. 12 illustrates an example of SRS groups, in accordance with an aspect of the present disclosure.

FIG. 11 illustrates example operations 1100 that may be performed by a network entity, in accordance with certain aspects of the present disclosure. Operations 1100 may be performed, for example, by a base station (e.g. a gNB) designed to participate in beamformed communications with one or more UEs.

Operations 1100 begin, at 1102 by receiving signaling, from a user equipment (UE), of capability information of the UE for non-codebook uplink transmissions, the capability information indicating at least one of a number of groups of precoding candidates for uplink transmissions supported by the UE and, for each group, a maximum number of precoding candidates the UE can support and a maximum number of precoding candidates that can be used simultaneously by the UE.

At 1104, the gNB determines a plurality of sounding reference signal (SRS) configurations for the UE, at least based on the signaled capability information. At 1106, the gNB transmits signaling, to the UE, indicating the plurality of configurations. At 1108, the gNB receives the SRSs transmitted by the UE.

At 1110, the gNB determines one or more SRS resources based at least on the received SRSs and the received capability information, wherein the precoding associated with the determined SRS resources is to be used simultaneously for sending the UL transmission. At 1112, the gNB signals, to the UE, an indication of the determined SRS resources.

In some cases, the capability information provided by the UE may include how many PUSCH precoder candidates it can support and how many PUSCH precoder candidates in the same group can be simultaneously signaled in PUSCH UL grant. Based on this capability information, the gNB can thus determine how to configure the SRS resources for the UE and can determine which combinations of SRIs are valid for simultaneous signaling in the UL grant.

On the UE-Side, if a UE is capable of up to rank-M non-codebook UL MIMO, the UE may report additional capabilities, such as the number of precoding candidate groups, G (which corresponds to the number of analog beamformers). For each group, the UE may report the maximum number of precoding candidates which the UE can support ($P_{max, g}$, g=0, 1, . . . , G−1), which may correspond to the single port SRS resources that can be configured to this UE. The UE may also report the maximum number of precoding candidates which can be signaled simultaneously ($Q_{max, g}$, g=0, 1, . . . , G−1), which may correspond to the number of TX chains associated with this group (e.g., 2 for TX0 and TX1 in FIG. 9).

On the gNB Side, the gNB may configure precoded SRS transmission based on the UE capability report. For example, if a UE is configured with non-codebook based UL MIMO, it may be configured with multiple SRS resources for each precoding candidate group. The number of SRS resources, for example, could be any number less than or equal to the maximum number of precoder candidates the UE reported ($\leq P_{max, g}$, s) that single port SRS resources can be configured for the gth group (where g=0, 1, . . . , G−1).

Each SRS resource is associated with a precoding candidate group. In some cases, each SRS resource may include a group ID. In other cases, a UE may be configured with multiple SRS resource sets, with each set associated with a group (e.g., a group ID is included in the SRS resource set configuration, each SRS resource set includes multiple SRS resources for the group).

When the gNB signals SRI(s) for indicating PUSCH precoder to the UE, the gNB may need to follow certain rules. For example, the rules may allow that precoder candidates in different groups can be simultaneously signaled. The number of candidates in Group g, however, may be limited to up to $Q_{max, g}$ precoder candidates that can be signaled simultaneously (e.g., dependent on the number of RF chains available for that group).

If UE received SRI(s) which violates above rules, an error event may be triggered at the UE. For example, the LTE may ignore the UL grant. In some cases, rather than ignoring the UL grant if the UE receives an unsupported SRI, the UE may fallback to some type of default transmission scheme. For example, the UE may fallback to some type of single port (non-MIMO) transmission mode.

Actual values of G and $Q_{max, g}$ may depend on implementation. For example, if the precoded SRSs are formed by full digital beamforming, G and $Q_{max}$ may be:

$G=1$ and $Q_{max,1}=M$ and either G or $Q_{max, 1}$ may need to be indicated in the UE capability report. As another example, if the precoded SRSs are formed by full analog beamforming, G and $Q_{max, g}$ may be:

$G=M$ and $Q_{max,g}=1$ and either G or $Q_{max, g}$ may need to be indicated in the UE capability report. As still another example, if the precoded SRSs are formed by hybrid beamforming, G and $Q_{max, g}$ may be:

$1<G<M$ and $\Sigma_g Q_{max,g}=M$

Referring back to FIG. 9, with the values shown, the UE may report up to rank-2 non-codebook based UL MIMO and may support 2 precoding candidate groups (one precoding candidate from each of Groups 1 and 2). Group 1 may support:

$P_{max,1}=4$: Up to 4 precoding candidates $Q_{max,1}=1$: Only a single candidate can be signaled at a time Group 2 may support up to 8 precoding candidates and:

$P_{max,2}=8$: Up to 8 precoding candidates $Q_{max,2}=1$: Only a single candidate can be signaled at a time Based on this information (reported by the UE), the gNB configuration may enable non-codebook based UL MIMO with 4 SRS resources (0, 1, 2, 3) for Group 1 and 4 SRS resources (4, 5, 6, 7) for Group 2. In other words, although the UE reports that up to 8 candidates can be provided in Group 2, the gNB may choose to configure less SRS resources (e.g., 4<8) for Group 2. As noted above, an SRS resource from each group may be simultaneously signaled. For example, the PUSCH precoder indication in the UL grant may simultaneously signal SRS resource 3 from Group 1 and SRS resource 6 from Group 2 (SRI=3, 6).

A UE that supports hybrid beamforming may support different types of SRS resource grouping. For example, a UE with hybrid beamforming support shown in FIG. 12, with one digital beamformer (DBF) and two analog beamformers (ABFs) per group, may report up to rank-4 non-codebook based UL MIMO and may support 2 precoding candidate groups. Group 1 may support:

$P_{max,1}$=4: Up to 4 precoding candidates $Q_{max,1}$=2: Up to 2 candidates can be signaled at a time Group 2 may support up to 8 precoding candidates and:

$P_{max,2}$=4: Up to 4 precoding candidates $Q_{max,2}$=2: Up to 2 candidates can be signaled at a time In this case, the gNB configuration may enable non-codebook based UL MIMO with 4 SRS resources (0, 1, 2, 3) for Group 1 and 4 SRS resources (4, 5, 6, 7) for Group 2. Due to the digital beamforming, the PUSCH precoder indication in UL grant may signal multiple SRS resources from one or more of the Groups (e.g., SRI=0, 4, 7), since up to two precoding candidates per group can be transmitted at a time.

In some cases, an UL grant may contain only a single SRI field. Each codepoint of the SRI field may correspond to a subset of the SRS resource set for non-codebook based UL.

In some cases, the SRS resource(s) selection may be semi-static, for example, signaled via radio resource control (RRC) signaling. For non-codebook based transmission, the UE can determine its PUSCH precoder and transmission rank based on the wideband SRI when multiple SRS resources are configured. In such cases, where the SRI is given by the SRS resource indicator in DCI or the SRI may be given via an SRS-ResourceIndicator.

In some cases, there may be only a single SRS resource set for non-codebook based UL transmissions. An SRS resource set generally refers to a group of precoding candidates. A maximum number of precoding candidates per group may depend on a number of single port SRS resources in an SRS resource set, while a maximum number of simultaneous precoding candidates per group may further depend on a number of transmit chains.

In some cases, there may be only one group of precoding candidates (e.g., a single SRS resource set), such that a UE does not need to report the number of groups. The maximum number of precoding candidates the UE can support may correspond to the maximum number of SRS resources that the UE can be configured for each group. In the event there is just one group (only one SRS resource set), the UE may report just a single number (e.g., X=1, 2, 4) as the maximum number of precoding candidates that can be used simultaneously by the UE.

In such cases, if the UE does not report the maximum number of precoding candidates (SRS resources) the UE can support as a UE capability, then a UE may be configured with N SRS resources (e.g., with N=1, 2, 4), where N can be larger than X (e.g., when X=2, but N=4). In such cases, solutions may be provided to address the simultaneous transmission issue.

According to one alternative, only certain combinations of N SRS resources can be signaled by SRI based on the SRS resource configuration. If two SRS resources are configured to be transmitted in the same symbol, the combination of these two SRS resources are valid and thus can be signaled via SRI. On the other hand, if two SRS resources are configured to be transmitted in different symbols, the combination of these two SRS resources may be considered invalid. If a UE receives an UL grant wherein the SRI indicates an invalid combination of SRS resources, the UE may ignore the UL grant.

As another alternative, any combinations of N SRS resources may be valid, but the UE may change the association between the precoding and the SRS resource. For example, when transmitting SRS, SRS resources 0 and 1 may be transmitted from TX0, while SRS resources 2 and 3 may be transmitted from TX1. If SRI indicates a combination of SRS resources 0 and 1, then the UE may change the precoding for SRS resource 1 (or resource 0), such that the SRS port in SRS resource 1 is mapped to TX1. In this case, the gNB may suffer from some performance loss, as the link adaptation is based on a different precoding/TX association assumption.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   signaling, to a network entity, capability information of the UE for non-codebook uplink (UL) transmissions, the capability information indicating at least one of a number of groups of precoding candidates for UL transmissions supported by the UE and, for each group, a maximum number of precoding candidates the UE can support and a maximum number of precoding candidates that can be used simultaneously by the UE;
   receiving signaling, from the network entity, indicating a plurality of sounding reference signal (SRS) configurations based at least on the signaled capability information, wherein at least one of the plurality of SRS configurations indicates at least one SRS resource;
   determining a plurality of precoding candidates, wherein each precoding candidate is associated with a configured SRS resource;
   transmitting SRSs using the associated precoding candidates;
   receiving signaling, from the network entity, indicating one or more SRS resources determined based at least on the signaled capability information; and
   determining precoding for sending an UL transmission based at least on the indicated one or more SRS resources.

2. The method of claim 1, wherein the at least one SRS resource indicated by the at least one of the plurality of SRS configurations is associated with at least one precoding candidate.

3. The method of claim 1, wherein the precoding candidates are grouped such that SRS precoding candidates from different groups can be transmitted simultaneously.

4. The method of claim 3, wherein a number of the SRS precoding candidates from a group that can be simultaneously transmitted depends, at least in part, on a number of radio frequency (RF) chains associated with that group.

5. The method of claim 1, wherein the indicated one or more SRS resources are signaled via an UL grant.

6. The method of claim 5, further comprising:
   ignoring the UL grant if the simultaneous use of the precoding candidates associated with the one or more SRS resources indicated in the UL grant for an UL transmission is not supported by the UE.

7. The method of claim 5, further comprising:
   falling back to a default transmission scheme for an UL transmission if the simultaneous use of the precoding candidates associated with the one or more SRS resources indicated in the UL grant for an UL transmission is not supported by the UE.

8. The method of claim 1, wherein a number of precoding candidate groups of the precoding candidates corresponds to a number of analog beamformers of the UE.

9. The method of claim 1, wherein the maximum number of precoding candidates the UE can support for a group corresponds to a number of single port SRS resources that can be configured for the UE.

10. The method of claim 1, wherein the maximum number of precoding candidates for a group that can be used simultaneously by the UE corresponds to a number of transmit chains associated with that group.

11. A method for wireless communications by a network entity, comprising:
    receiving signaling, from a user equipment (UE), of capability information of the UE for non-codebook uplink (UL) transmissions, the capability information indicating at least one of a number of groups of precoding candidates for UL transmissions supported by the UE and, for each group, a maximum number of precoding candidates the UE can support and a maximum number of precoding candidates that can be used simultaneously by the UE;
    determining a plurality of sounding reference signal (SRS) configurations for the UE, at least based on the signaled capability information;
    transmitting signaling, to the UE, indicating the plurality of SRS configurations;
    receiving SRSs transmitted by the UE;
    determining one or more SRS resources based at least on the received SRSs and the received capability information, wherein precoding associated with the determined one or more SRS resources is to be used simultaneously for sending an UL transmission; and
    signaling, to the UE, an indication of the determined one or more SRS resources.

12. The method of claim 11, wherein at least one of the plurality of SRS configurations is associated with at least one precoding candidate.

13. The method of claim 11, wherein the determined one or more SRS resources are signaled to the UE via an UL grant.

14. The method of claim 11, wherein a number of precoding candidate groups of the precoding candidates corresponds to a number of analog beamformers of the UE.

15. The method of claim 11, wherein the maximum number of precoding candidates the UE can support for a group corresponds to a number of single port SRS resources that can be configured for the UE.

16. The method of claim 11, wherein the maximum number of precoding candidates for a group that can be used simultaneously by the UE corresponds to a number of transmit chains associated with that group.

17. An apparatus for wireless communications by a user equipment (UE), comprising:
    means for signaling, to a network entity, capability information of the UE for non-codebook uplink (UL) transmissions, the capability information indicating at least one of a number of groups of precoding candidates for UL transmissions supported by the UE and, for each group, a maximum number of precoding candidates the UE can support and a maximum number of precoding candidates that can be used simultaneously by the UE;
    means for receiving signaling, from the network entity, indicating a plurality of sounding reference signal (SRS) configurations based at least on the signaled capability information, wherein at least one of the plurality of SRS configurations indicates at least one SRS resource;
means for determining a plurality of precoding candidates, wherein each precoding candidate is associated with a configured SRS resource;
means for transmitting SRSs using the associated precoding candidates;
means for receiving signaling, from the network entity, indicating one or more SRS resources determined based at least on the signaled capability information; and
means for determining precoding for sending an UL transmission based at least on the indicated one or more SRS resources.

18. The apparatus of claim 17, wherein the at least one SRS resource indicated by the at least one of the plurality of SRS configurations is associated with at least one precoding candidate.

19. The apparatus of claim 17, wherein the precoding candidates are grouped such that SRS precoding candidates from different groups can be transmitted simultaneously.

20. The apparatus of claim 19, wherein a number of the SRS precoding candidates from a group that can be simultaneously transmitted depends, at least in part, on a number of radio frequency (RF) chains associated with that group.

21. The apparatus of claim 17, wherein the indicated one or more SRS resources are signaled via an UL grant.

22. The apparatus of claim 21, further comprising:
means for ignoring the UL grant if the simultaneous use of the precoding candidates associated with the one or more SRS resources indicated in the UL grant for an UL transmission is not supported by the UE.

23. The apparatus of claim 21, further comprising:
means for falling back to a default transmission scheme for an UL transmission if the simultaneous use of the precoding candidates associated with the one or more SRS resources indicated in the UL grant for an UL transmission is not supported by the UE.

24. The apparatus of claim 17, wherein a number of precoding candidate groups corresponds to a number of analog beamformers of the UE.

25. The apparatus of claim 17, wherein the maximum number of precoding candidates the UE can support for a group corresponds to a number of single port SRS resources that can be configured for the UE.

26. The apparatus of claim 17, wherein the maximum number of precoding candidates for a group that can be used simultaneously by the UE corresponds to a number of transmit chains associated with that group.

27. An apparatus for wireless communications by a network entity, comprising:
means for receiving signaling, from a user equipment (UE), of capability information of the UE for non-codebook uplink (UL) transmissions, the capability information indicating at least one of a number of groups of precoding candidates for UL transmissions supported by the UE and, for each group, a maximum number of precoding candidates the UE can support and a maximum number of precoding candidates that can be used simultaneously by the UE;
means for determining a plurality of sounding reference signal (SRS) configurations for the UE, at least based on the signaled capability information;
means for transmitting signaling, to the UE, indicating the plurality of SRS configurations;
means for receiving SRSs transmitted by the UE;
means for determining one or more SRS resources based at least on the received SRSs and the received capability information, wherein the precoding associated with the determined one or more SRS resources is to be used simultaneously for sending an UL transmission; and
means for signaling, to the UE, an indication of the determined one or more SRS resources.

28. The apparatus of claim 27, wherein at least one of the plurality of SRS configurations is associated with at least one precoding candidate.

29. The apparatus of claim 27, wherein the determined one or more SRS resources are signaled to the UE via an UL grant.

30. The apparatus of claim 27, wherein a number of precoding candidate groups of the precoding candidates corresponds to a number of analog beamformers of the UE.

31. The apparatus of claim 27, wherein the maximum number of precoding candidates the UE can support for a group corresponds to a number of single port SRS resources that can be configured for the UE.

32. The apparatus of claim 27, wherein the maximum number of precoding candidates for a group that can be used simultaneously by the UE corresponds to a number of transmit chains associated with that group.

* * * * *